US006257389B1

(12) United States Patent
Paping et al.

(10) Patent No.: US 6,257,389 B1
(45) Date of Patent: Jul. 10, 2001

(54) DEVICE FOR EXAMINING SECURITIES

(75) Inventors: Martin Paping, Basel; Oskar Meier, Ennetbaden, both of (CH)

(73) Assignee: Ascom Autelca AG, Gumligen (CH)

( * ) Notice: Subject to any disclaimer, the term of this patent is extended or adjusted under 35 U.S.C. 154(b) by 0 days.

(21) Appl. No.: 09/244,988

(22) Filed: Feb. 4, 1999

(30) Foreign Application Priority Data

Feb. 5, 1998 (EP) ........................................ 98810084

(51) Int. Cl.[7] ........................ G06K 7/01; G07D 7/06
(52) U.S. Cl. ........................................ 194/207; 194/206
(58) Field of Search ................................ 194/206, 207; 250/556; 356/71

(56) References Cited

U.S. PATENT DOCUMENTS

| | | | | |
|---|---|---|---|---|
| 4,146,792 | | 3/1979 | Stenzel et al. . | |
| 4,525,630 | | 6/1985 | Chapman . | |
| 4,587,434 | * | 5/1986 | Roes et al. | 250/556 |
| 4,922,109 | * | 5/1990 | Bercovitz et al. | 250/556 |
| 5,280,333 | * | 1/1994 | Wunderer | 356/71 |
| 5,304,813 | | 4/1994 | De Man . | |
| 5,476,169 | * | 12/1995 | Takarada et al. | 194/207 |
| 5,496,879 | * | 3/1996 | De Man | 250/556 |
| 5,598,006 | | 1/1997 | Stringa . | |
| 5,923,413 | * | 7/1999 | Laskowski | 356/71 |
| 6,044,952 | * | 4/2000 | Haggerty et al. | 194/207 |
| 6,050,387 | * | 4/2000 | Iwaki | 194/207 |

FOREIGN PATENT DOCUMENTS

| | | | |
|---|---|---|---|
| 9103031 | | 3/1991 | (WO) . |
| WO 97/31340 | * | 8/1997 | (WO) . |

* cited by examiner

*Primary Examiner*—Eileen D. Lillis
*Assistant Examiner*—Thuy V. Tran

(57) ABSTRACT

The device for examining securities, especially bank notes, includes a transport facility for conveying securities along a transport path and a recognition facility arranged on the transport path. The recognition facility has two integrated optical modules arranged alongside each other for scanning securities in two different wavelength ranges. The optical modules are arranged with their long axes basically parallel to each other, and at the same time slightly tipped toward each other. The optical module extends over an entire breadth of the transport path. It includes several light sources arranged at regular intervals, a larger number of optical imagining elements and several optical detectors, whereby the security is passed by a transparent front panel of the module.

7 Claims, 2 Drawing Sheets

DEVICE FOR EXAMINING SECURITIES

FIELD OF THE INVENTION

The invention concerns a device for examining securities, especially bank notes, including a transport facility for conveying the securities along a transport path and a recognition facility arranged on the transport path.

BACKGROUND OF THE INVENTION

The automatic recognition of bank notes and other securities is an important concern in the bank area as well as, for example, at the point of sale. The construction of hardware is not unimportant for a trouble-free transport of bank notes and the quality of the reading process. It should make possible a high processing speed. The precision and performance capacity of the hardware frequently leads to high equipment costs owing to which market opportunities can be perceptibly reduced.

A device for examining the authenticity of individual bank notes at the point of sale is known from U.S. Pat. No. 5,607,040. It is outfitted with two optical scanners lying directly opposite each other in order to scan the front and reverse side of the bank note. Rollers for transporting the bank notes are provided in front of and behind the scanners. The rod-like optical scanners are constructed for digitalization and detection of the numbers printed on the notes. The notes are transported and processed longitudinally.

Rod-like optical scanners are known from U.S. Pat. No. 5,489,992 and U.S. Pat. No. 5,214,273, for example, and are obtainable on the market.

A note recognition device is known from DE 39 17 419 A1 wherein the bank note is illuminated with a light source for testing value and authenticity which covers at least two different wavelength ranges. The reflected light is detected with two different sensors (green light and red light sensor) and recorded line by line. A difference signal is determined and compared with a specified pattern for recognition.

The known devices are unsatisfactory in mechanical and electronic respects.

SUMMARY OF THE INVENTION

The object of the invention is to indicate a device of the abovementioned type which has effective and nonetheless relatively economical hardware. In particular, a high degree of certainty of recognition at a high transportation speed should be made possible.

In accordance with the invention, the recognition facility includes two integrated optical modules arranged alongside each other for scanning the securities in two different wavelength ranges.

Each module is a mechanically closed unit, and generates and processes the prescribed wavelength in any given case independently. As a consequence, the optical components can be optimally adjusted to the respective spectral range. Manufacture of the device of the invention can take place with prefabricated components which have a prescribed (geometrical-mechanical) precision in themselves. When assembling, it is sufficient to ensure that the module is exactly positioned.

In accordance with an especially preferred embodiment of the invention, the modules are assembled with parallel long axes but with front panels slightly tipped in relation to each other. The modules thus both scan the same side of the security whereby the scanning housing areas are slightly tipped toward each other, as mentioned. It should be noted that this aspect of the invention is independent of whether the modules process different wavelength ranges or not.

The scanning housing surfaces are, for example, tipped toward each other at an angle larger than 0°. If the angle is too small, the place of the line of contact between bank note and rear front panel is not specified sufficiently accurately. If on the contrary, the angle is too large, then the front panel mentioned acts as an obstacle instead of as a deflection.

Front panels impinge upon each other at the edges (or the adjacent side walls) and thereby enables reliable guidance of the security without the aid of additional mechanical guide elements. The rear module in the direction of conveyance can easily be set back in relation to the front one (for example, by 1 mm).

Due to the tipped arrangement of the front panel of the second module, the front edge of the bank notes is pushed on to the front panel of the second module after leaving the front panel of the rear module at a certain angle. The inclination of the second front panel forces a small change in direction. As a consequence of this, the leaf-like object is bent. Due to a certain internal stability, the bending leads to the bank note standing in contact with the front panel in the area of the scanning axis of the second module.

Setting the second module back in relation to the first can, in addition, be used to fix the place on which the bank note strikes the front panel.

The integrated optical modules are advantageously asymmetrical when regarded in cross section toward the long axis. The optical scanning axes of the adjacent module can be brought closer to each other in this way. The modules are basically constructed identically (even if operating with different wavelengths), and laid almost laterally inverted alongside each other.

The wavelength ranges of the first module can lie in the visible range and that of the other outside the visible spectrum. For example, the first module can operate with green light and the other with infrared or ultraviolet light. But more than two wavelengths and a corresponding number of modules can be provided. Basically each module operates monochromatically. It is conceivable, however, that, for example, one of the modules may process several wavelengths.

An optical module suitable for recognition extends over the entire breadth of the transport path of the securities. For example, several light sources (e.g, light-emitting diodes) are integrated—arranged at regular intervals—for illuminating the surface of the security to be examined. Instead of individual punctiform light sources, a fluorescent tube or the like can also be provided. The optical scanning axis is imaged by a larger number of imaging elements (for example, rod lenses) on optical detector points. The number of detector points as a rule corresponds to a multiple (for example, tenfold) of the imaging elements. The entire arrangement is located in a tightly closed, prismatic (for example, square in cross section) housing with a transparent cover.

Over against the optical model, a transport roller is advantageously provided. The bank notes are pressed by this onto the transparent front sides of the module. The roller mentioned can be arranged approximately in the middle between the modules (that is, at the transition of the front sides adjacent to one another). For example, it makes contact in the area of the rear edge of the front panel in the direction of transport. The object is to assure, with a single roller or drum, that the security is in contact with the modules (namely in the area of the scanning axis) so that an unchanging optical imaging quality exists.

The entire device (feeding apparatus, transport track, storage, etc.) is preferably constructed such that the bank notes (or securities) can be transported and processed crosswise. At the specified transport speed, more bank notes can consequently be processed per unit of time. Furthermore, a deviation from the correct position is less critical.

Further advantageous embodiments and feature combinations of the invention emerge from the subsequent detailed description and the entirety of the patent claims.

BRIEF DESCRIPTION OF THE DRAWINGS

The drawings used to explain the embodiment depict.

DETAILED DESCRIPTION OF

Figure 1:
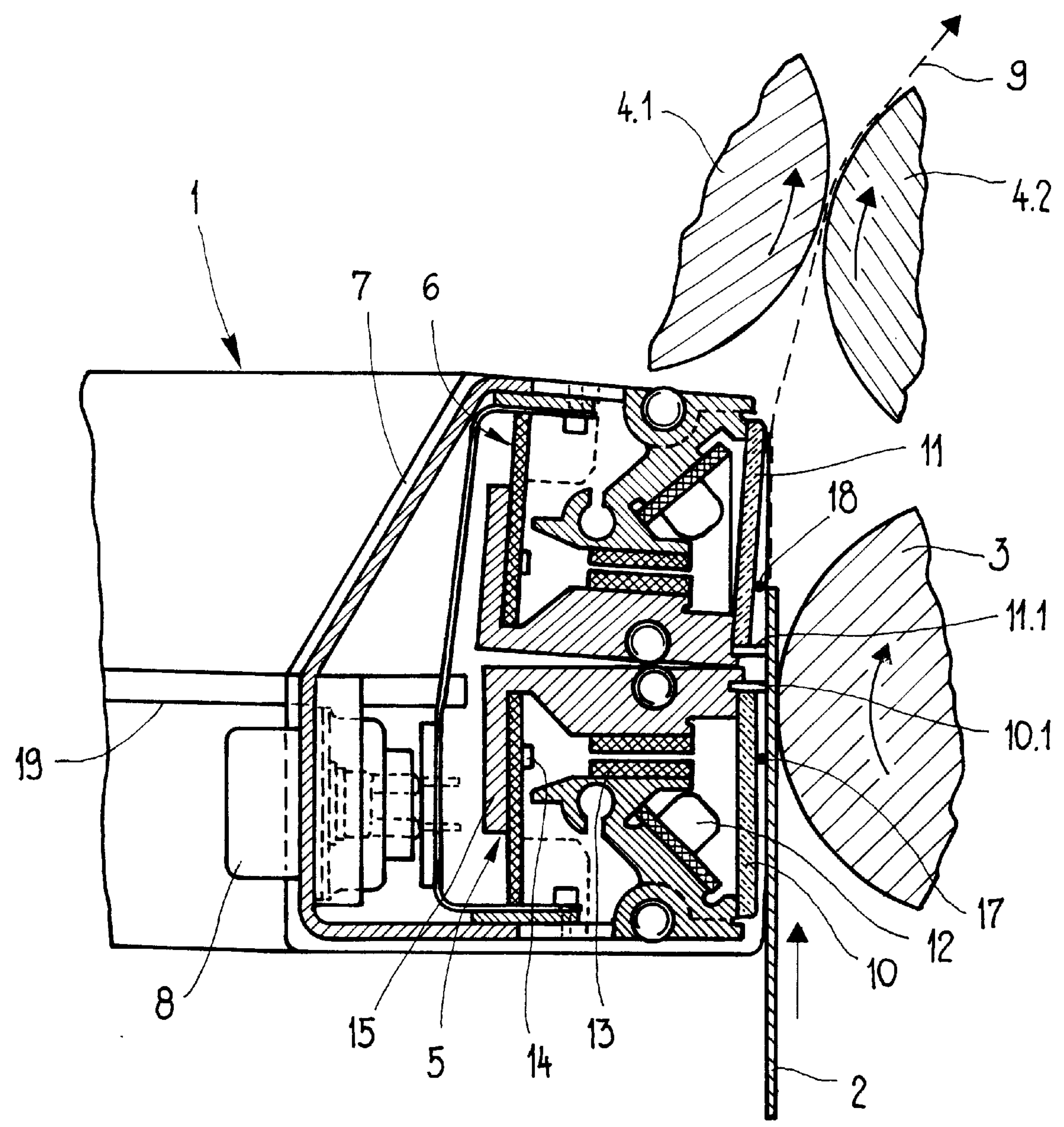
FIG. 1 A schematic representation of a device of the invention in cross section.

FIG. 1 schematically depicts a cutaway from an arrangement for examining and storing or sorting bank notes 2. These are transported by a more or less complex system of rollers, guide fins etc. from an input slot to a note storage space (not represented). Reading station 1 is located at a suitable place in the transport system.

In the present context, only reading station 1 of the invention is of interest. It scans the bank notes 2 conveyed by the feeding apparatus (not represented), identifies them, and examines their authenticity.

Transport systems for securities are inherently familiar and do not need to be explained in greater detail at this point. For example, two rollers 4.1, 4.2 are shown in FIG. 1 which pick up the bank note 2 adjacent to reading station 1 and convey it in the desired direction on a specified transport path 9. Typically bank note 2 is fed in a comparable manner to reading station 1. In order to assure the most reliable transport possible, the roller pairs positioned before and after are brought as near as possible to reading station 1. In addition, a roller 3 is provided over against reading station 1 which presses the bank note 2 on the transparent front panels 10, 11. It should be recognized that roller 3 is so positioned and arranged that the bank note 2 is pressed on in the area of the rear edge 10.1 of anterior front panel 10. Reading station 1 includes two optical modules 5, 6. These are held parallel but tipped slightly toward one another by a mounting 7. As can be recognized on the basis of FIG. 1, the tipping angle is on the order of magnitude of, for example, 5°. The two front panels 10, 11 are thus not parallel to each other. It should furthermore be noted that the front panel 11 is slightly set back (for example, 1–3 mm) in relation to front panel 10 in a direction perpendicular to the transport path 9 at the transition between the two modules 5, 6.

The mounting 7 also bears a plug connection 8, for example. This represents the hardware interface between the modules 5, 6 and the electronics (not represented) for evaluation of the signals. In the present example, the electronics is accommodated on one or more plates 19 which are likewise pushed in the housing of reading station 1. The plates 19 extend, for example, perpendicular to the transport path (in FIG. 1, to the left).

The two optical modules are basically constructed identically. For this reason, only module 5 will be described below.

The long axis of module 5 stands perpendicular to the drawing plane in FIG. 1 (that is, parallel to the axis of rotation of roller 3). The housing of module 5 is square, for example, in cross section. The already mentioned transparent front panel 10 is arranged on the front side. In module 5, the light source as well as the photodetectors are integral. Light-emitting diodes 12, for example, serve as a source of light which illuminate the scanning axis 17 (cf. also FIG. 2). With a module length in the area from 15 to 25 cm, for example, 30 to 60 light-emitting diodes are distributed at regular intervals over the length. The radiation cone of the light-emitting diodes 12 can overlap so that the most uniform illumination possible is attained.

The scanning axis 17 is imaged with a series of rod lenses 13 (or other suitable optical imaging elements) on CCD detectors 14 on the back wall 15 of the module 5. The number of rod lenses 13 is greater than that of the light-emitting diodes 12. For example, 100 rod lenses are provided with 20 to 40 light-emitting diodes (thus about 4 to 8 times as many).

The individual pixels of the CCD detectors 14 are very small in relation to the aperture of the rod lenses 13. Typically several thousand pixels are distributed over the length of the imaged scanning axis.

As can be recognized from FIG. 1, the construction of module 5 is asymmetrical in cross section. The scanning axis is consequently not situated in the middle of front panel 10 but rather closer to edge 10.1. The second module 6 is constructed or arranged in mirror image to module 5. Its scanning axis is shifted from the middle away toward edge 11.1. In this way, it results that the distance of the scanning axis is smaller than the width of an individual module (for example, ⅔ of the width).

Front panels 10 and 11, preferably displaced in relation to each another, press on edges 10.1 and 11.1. The bank note 2 thus presses at an angle of, for example, a few degrees on front panel 11 and is appropriately deflected.

Figure 2:
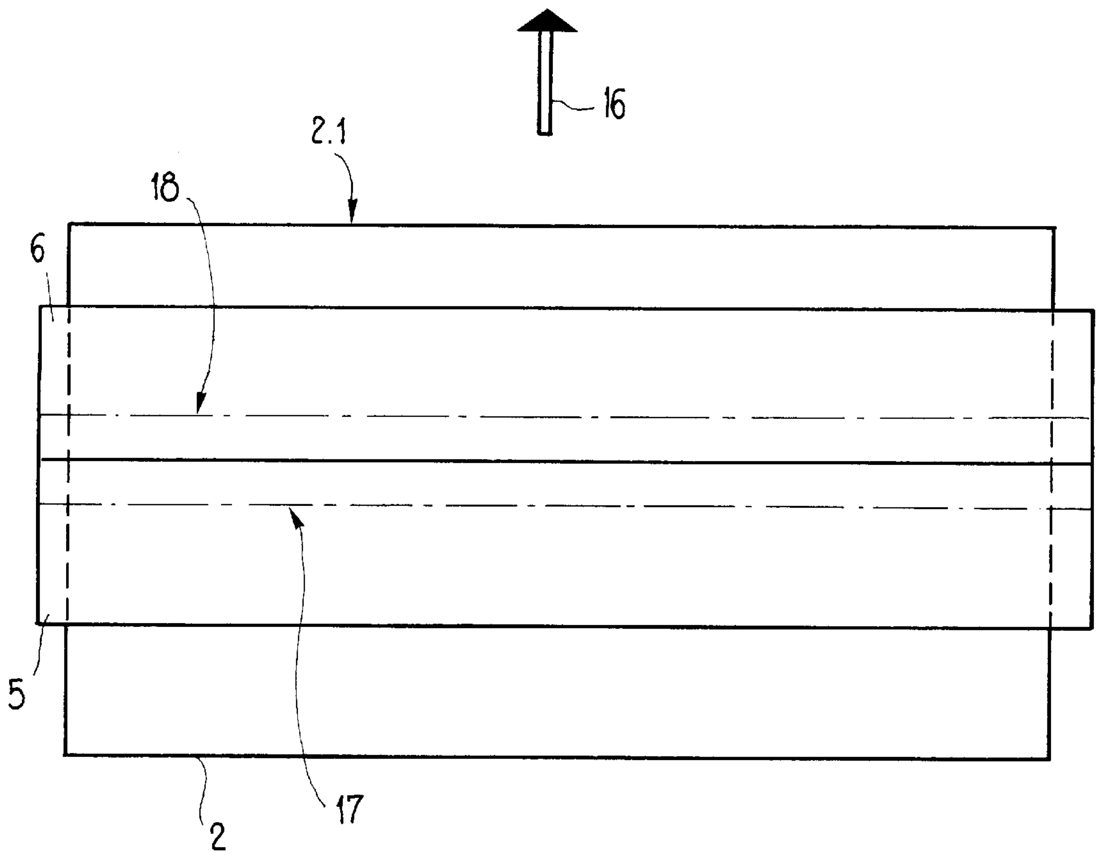
FIG. 2 A schematic representation of the device mentioned in plan view. Basically identical parts are provided with the same reference numbers.

FIG. 2 schematically depicts the arrangement according to FIG. 1 in plan view. The bank note 2 is passed by the modules 5, 6 in transport direction 16. The long edge 2.1 of bank note 2 stands crosswise to direction of transport 16. The scanning axes 17, 18 of modules 5, 6 likewise run transverse to transport direction 16 and have a minimal mutual distance.

In accordance with a preferred embodiment, the lateral edge of bank note 2 is not specified with respect to position by corresponding guides of the transport system, but rather ascertained in connection with processing the data. It thus does not depend on which position bank note 2 assumes in the direction perpendicular to direction of transport 16. The edge and consequently the position of the feature to be examined is computed from image data. This has the advantage that without special measures with respect to hardware, notes of completely different size can be processed.

The reading station of the invention conducts an examination on the basis of optically detectable features of the bank note. For example, specified areas of the bank note can be tested with the aid of pattern recognition processes. Image signals which are scanned with the modules in various spectral areas (for example, green, red, infrared) form the basis of the analysis.

Obviously, the figures show only one of the many possible embodiments of the invention. If, for example, the security is to be scanned from both sides, two of the arrangements shown in the figures can be provided. They are arranged one after the other in the direction of transport. If the two sides of the paper show different features, then it can be quite appropriate to scan front and reverse side in different wavelength ranges.

The inclined position and the setting back of the second module in relation to the first can be used in combination or individually. It is basically not ruled out that several modules follow directly upon one another in the manner of the invention.

A monochromatic detection can be attained by using a monochromatic light source or a monochromatic photodetector and/or by using appropriate filters.

With regard to production engineering, the modular construction realizable with the embodiments described is of interest. It facilitates an economical manufacture method.

In sum, it should be stated that the device of the invention allows a rapid and reliable examination of securities with the aid of optical pattern recognition. The invention is particularly suited for applications in the banking sector (semiautomatic or fully automatic note deposits, automatic tellers for withdrawing and depositing cash). The automatic examination of personal identity documents or other personal documents may be another possible area of application after "particularly".

Finally, the above-described embodiments of the invention are intended to be illustrative only. Numerous alternative embodiments may be devised by those skilled in the art without departing from the spirit and scope of the following claims.

What is claimed is:

1. A device for examining securities, especially banknotes, including a) a transport facility for conveying the securities along a transport path b) a recognition device arranged on the transport path, wherein the recognition device has two integrated optical modules arranged alongside, and with their long axes substantially parallel to each other for scanning securities in two different wavelength ranges, each optical modules has a front panel facing the transport path and front panels of the optical modules are slightly tipped toward each other.

2. The device according to claim 1 wherein the front panels of the optical modules are tipped toward each other at an angle greater than 0° to less than 10°.

3. The device according to claim 1, wherein the optical modules are constructed asymmetrical in cross section, and are arranged alongside each other such that scanning axes have a distance from each other.

4. The device according to claim 1, wherein the optical modules are monochromatic, and at least one of the modules is constructed for scanning in a visible spectrum range and one outside a visible spectral area.

5. The device according to claim 1, wherein the optical module extends over an entire breadth of the transport path and the front panel which is an integral component of the module, has several light sources arranged at regular intervals, a larger number of optical imaging elements and several optical detectors.

6. The device according to claim 1, wherein a transport roller is arranged over and against the recognition device which causes the securities to slide along a surface of the front panels of the optical modules.

7. The device according to claim 1, wherein the device is constructed for the transport of securities with their long edge crosswise toward the direction of transport.

* * * * *